United States Patent
Wang et al.

(10) Patent No.: US 11,636,848 B2
(45) Date of Patent: *Apr. 25, 2023

(54) TOKEN-WISE TRAINING FOR ATTENTION BASED END-TO-END SPEECH RECOGNITION

(71) Applicant: TENCENT AMERICA LLC, Palo Alto, CA (US)

(72) Inventors: Peidong Wang, Columbus, OH (US); Jia Cui, Bellevue, WA (US); Chao Weng, Fremont, CA (US); Dong Yu, Bothell, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 17/316,856

(22) Filed: May 11, 2021

(65) Prior Publication Data
US 2021/0264901 A1    Aug. 26, 2021

Related U.S. Application Data

(63) Continuation of application No. 16/275,971, filed on Feb. 14, 2019, now Pat. No. 11,037,547.

(51) Int. Cl.
*G10L 15/06*    (2013.01)
*G10L 15/22*    (2006.01)
(Continued)

(52) U.S. Cl.
CPC .............. *G10L 15/063* (2013.01); *G06N 7/01* (2023.01); *G06N 20/00* (2019.01); *G10L 15/14* (2013.01);
(Continued)

(58) Field of Classification Search
CPC .. G10L 15/14; G10L 15/22; G10L 2015/0635; G10L 15/063; G06N 20/00; G06N 7/005
See application file for complete search history.

(56) References Cited

U.S. PATENT DOCUMENTS

2017/0076200 A1    3/2017    Nasu
2017/0148433 A1    5/2017    Catanzaro et al.
(Continued)

OTHER PUBLICATIONS

Miao et al., "EESEN: End-To-End Speech Recognition Using Deep RNN Models And WFST-Based Decoding", ASRU, 2015, pp. 167-174 (total 8 pages).
(Continued)

*Primary Examiner* — Sonia L Gay
(74) *Attorney, Agent, or Firm* — Sughrue Mion, PLLC

(57) ABSTRACT

A method of attention-based end-to-end (A-E2E) automatic speech recognition (ASR) training, includes performing cross-entropy training of a model, based on one or more input features of a speech signal, determining a posterior probability vector at a time of a first wrong token among one or more output tokens of the model of which the cross-entropy training is performed, and determining a loss of the first wrong token at the time, based on the determined posterior probability vector. The method further includes determining a total loss of a training set of the model of which the cross-entropy training is performed, based on the determined loss of the first wrong token, and updating the model of which the cross-entropy training is performed, based on the determined total loss of the training set.

17 Claims, 6 Drawing Sheets

(51) Int. Cl.
    *G10L 15/14*       (2006.01)
    *G06N 20/00*    (2019.01)
    *G06N 7/01*      (2023.01)

(52) U.S. Cl.
    CPC ...... *G10L 15/22* (2013.01); *G10L 2015/0635* (2013.01)

(56) References Cited

U.S. PATENT DOCUMENTS

| | | |
|---|---|---|
| 2018/0330718 A1 | 11/2018 | Hori et al. |
| 2018/0357566 A1 | 12/2018 | Liu et al. |
| 2019/0362229 A1 | 11/2019 | Norouzi et al. |
| 2020/0027444 A1 | 1/2020 | Prabhavalkar et al. |
| 2020/0043483 A1 | 2/2020 | Prabhavalkar et al. |

OTHER PUBLICATIONS

International Search Report for PCT/US2020/017122 dated Apr. 27, 2020.
Written Opinion of the International Searching Authority for PCT/US2020/017122 dated Apr. 27, 2020.

It is not easy to wreck a nice beach
It is noisy to recognize a speech
It is not easy to recognize speech Longest correct prefix
Largest posterior
Reference

*First wrong token in hypothesis with the longest correct prefix*

FIG. 4

TOKEN-WISE TRAINING FOR ATTENTION BASED END-TO-END SPEECH RECOGNITION

CROSS-REFERENCE TO RELATED APPLICATION

This application is a continuation of U.S. patent application Ser. No. 16/275,971, filed on Feb. 14, 2019, in the U.S. Patent and Trademark Office, which is incorporated by reference herein in its entirety.

BACKGROUND

Attention-based end-to-end (A-E2E) automatic speech recognition (ASR) systems differ from conventional hidden Markov model (HMM) systems in that speech signals are mapped directly to tokens (characters/subwords/words). This enables the A-E2E ASR systems to use training criteria close to evaluation metrics such as character error rate (CER) and word error rate (WER).

To back propagate CER and/or WER loss to model parameters, a policy gradient for A-E2E ASR models may be used. An expected CER and/or WER may first be calculated by a sampling-based method. The policy gradient may then be applied to directly optimize the expected CER and/or WER. Inspired by minimum Bayes risk (MBR) training for conventional HMM-based models, minimum word error rate (MWER) training may be used for A-E2E ASR systems. A loss of MWER training is an expected number of word errors. Because an accurate calculation of such loss is inefficient, two approximation methods may be used. A first method is based on sampling, and a second method uses n-best hypotheses generated during training. Experimental results show that an n-best hypotheses-based loss estimation outperforms a sampling-based one. MWER training may be improved with softmax smoothing during n-best hypotheses generation. Competitive results may be obtained using the Switchboard (SWBD) 300h corpus.

In A-E2E ASR systems, due to a dependency in output tokens, a correction of first few errors may be of high importance. A fine-grained partial error can be viewed as an attempt towards this direction. With a length-normalized edit distance, tokens at a beginning of an output sequence are assigned more weights in a loss. Experimental results show that an employment of a fine-grained partial error may be important to performance improvements. An extreme to a weighting approach is to completely mask out a loss after a first wrong token. Such a training scheme is widely applied under the name early update in machine translation, spoken dialogue processing, and tagging and parsing problems of natural language processing (NLP). When applied to A-E2E ASR models, a standard early update method may assign nonzero gradients to beginning correct tokens.

FIG. 6 is a diagram of a difference between a regular sequence-based training scheme and an early update training scheme. In both cases (a) and (b), gradients are calculated in the same way but they are applied in different positions of a hypothesis-reference (Hyp-Ref) pair.

SUMMARY

According to embodiments, a method of A-E2E ASR training, includes performing cross-entropy training of a model, based on one or more input features of a speech signal, determining a posterior probability vector at a time of a first wrong token among one or more output tokens of the model of which the cross-entropy training is performed, and determining a loss of the first wrong token at the time, based on the determined posterior probability vector. The method further includes determining a total loss of a training set of the model of which the cross-entropy training is performed, based on the determined loss of the first wrong token, and updating the model of which the cross-entropy training is performed, based on the determined total loss of the training set.

According to embodiments, an apparatus for A-E2E ASR training, includes at least one memory configured to store program code, and at least one processor configured to read the program code and operate as instructed by the program code. The program code includes performing code configured to cause the at least one processor to perform cross-entropy training of a model, based on one or more input features of a speech signal, first determining code configured to cause the at least one processor to determine a posterior probability vector at a time of a first wrong token among one or more output tokens of the model of which the cross-entropy training is performed, and second determining code configured to cause the at least one processor to determine a loss of the first wrong token at the time, based on the determined posterior probability vector. The program code further includes third determining code configured to cause the at least one processor to determine a total loss of a training set of the model of which the cross-entropy training is performed, based on the determined loss of the first wrong token, and updating code configured to cause the at least one processor to update the model of which the cross-entropy training is performed, based on the determined total loss of the training set.

According to embodiments, a non-transitory computer-readable medium stores instructions that, when executed by at least one processor of a device, cause the at least one processor to perform cross-entropy training of a model, based on one or more input features of a speech signal, determine a posterior probability vector at a time of a first wrong token among one or more output tokens of the model of which the cross-entropy training is performed, and determine a loss of the first wrong token at the time, based on the determined posterior probability vector. The instructions further cause the at least one processor to determine a total loss of a training set of the model of which the cross-entropy training is performed, based on the determined loss of the first wrong token, and update the model of which the cross-entropy training is performed, based on the determined total loss of the training set.

BRIEF DESCRIPTION OF THE DRAWINGS

FIG. 4 is a diagram of a first wrong token in a hypothesis with a longest correct prefix, according to embodiments.

DETAILED DESCRIPTION

Attention based end-to-end speech recognition models are trained to directly minimize errors in output tokens (characters/subwords/words). Given that each output token is dependent on previous outputs, decoding errors could easily be propagated along an output sequence.

Embodiments described herein include a token-wise training (TWT) scheme that acts only on a first wrong token in a hypothesis. Once the first wrong token is corrected, following errors might also be able to be corrected without extra model parameter tuning. Compared to sequence-based MWER training, the TWT scheme is more conservative for training and thus convergence is more stable. The TWT scheme is also flexible and can be combined with a variety of loss functions.

Extending TWT for multiple hypotheses, the embodiments described herein also include a TWT in beam (TWTiB) training scheme. Rather than selecting a hypothesis with a largest posterior as in most training algorithms, a hypothesis that has a longest correct prefix is selected. TWTiB outperforms a MWER criterion on a benchmark SWBD 300$h$ data set.

These above schemes provide a new learning principle for sequence-to-sequence learning and yield a best result on a benchmark speech recognition dataset.

Definitions of abbreviations and terms occurring in the detailed description include the following:

Speech recognition system: a computer program that enables recognition and translation of speech signals into written characters/words.

Encoder-decoder: a type of model architecture in which an encoder network maps raw inputs into feature representations and a decoder takes the feature representation as input and produces an output.

Attention-based end-to-end (A-E2E) models: a type of model with encoder-decoder architecture plus an attention scheme that enables the model to learn to focus on specific parts of an input sequence during decoding.

Point-wise Loss: a loss function that is calculated based on two tokens, whether they are the same or not.

Sequence-wise Loss: a loss function that is calculated based on a similarity between two sequences. Usually an optimal alignment of two sequences is given and then differences are summed over.

Figure 1:
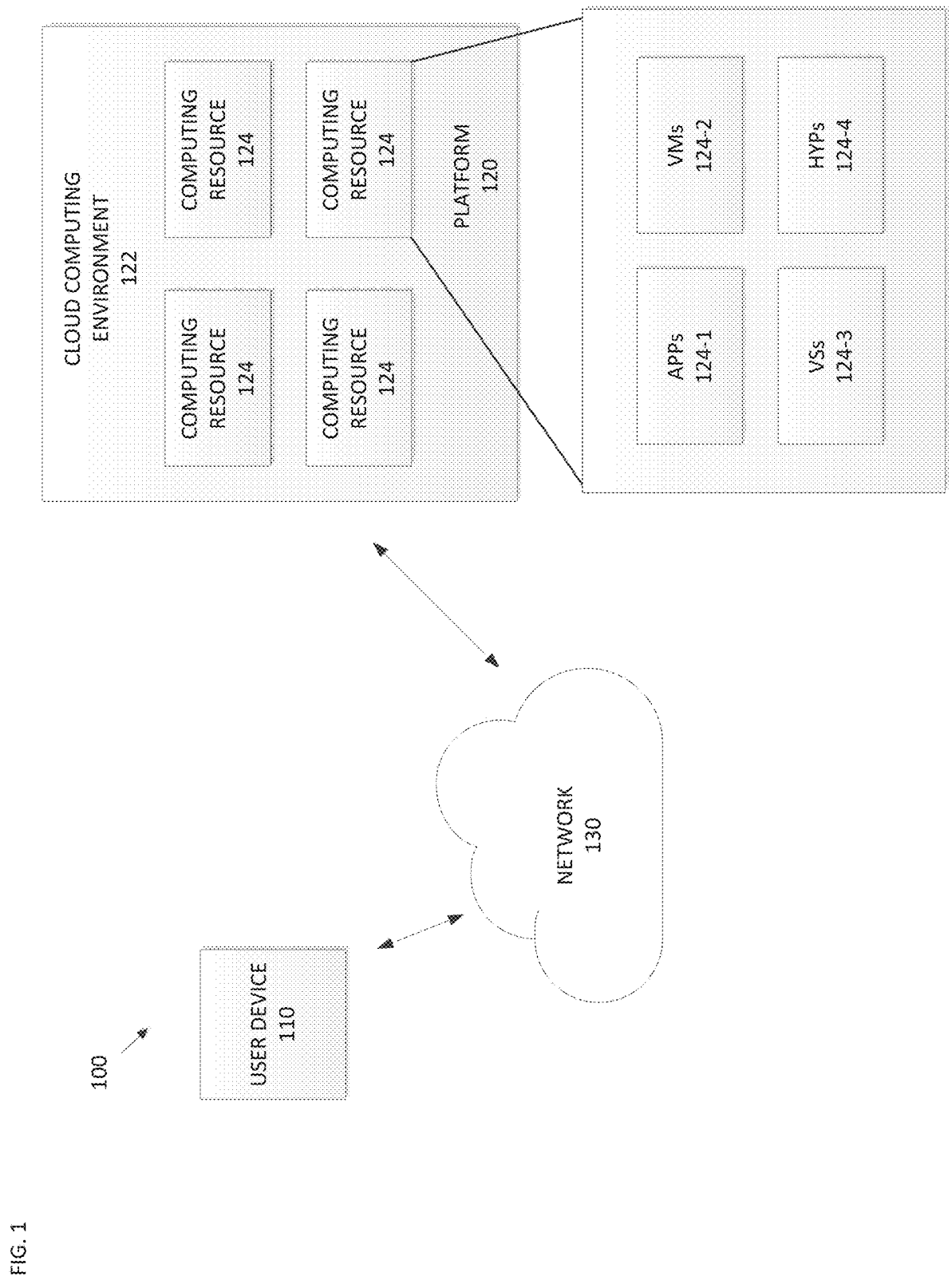
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments. As shown in FIG. 1, environment 100 may include a user device 110, a platform 120, and a network 130. Devices of environment 100 may interconnect via wired connections, wireless connections, or a combination of wired and wireless connections.

User device 110 includes one or more devices capable of receiving, generating, storing, processing, and/or providing information associated with platform 120. For example, user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 110 may receive information from and/or transmit information to platform 120.

Platform 120 includes one or more devices as described elsewhere herein. In some implementations, platform 120 may include a cloud server or a group of cloud servers. In some implementations, platform 120 may be designed to be modular such that software components may be swapped in or out depending on a particular need. As such, platform 120 may be easily and/or quickly reconfigured for different uses.

In some implementations, as shown, platform 120 may be hosted in cloud computing environment 122. Notably, while implementations described herein describe platform 120 as being hosted in cloud computing environment 122, in some implementations, platform 120 is not be cloud-based (i.e., may be implemented outside of a cloud computing environment) or may be partially cloud-based.

Cloud computing environment 122 includes an environment that hosts platform 120. Cloud computing environment 122 may provide computation, software, data access, storage, etc. services that do not require end-user (e.g., user device 110) knowledge of a physical location and configuration of system(s) and/or device(s) that hosts platform 120. As shown, cloud computing environment 122 may include a group of computing resources 124 (referred to collectively as "computing resources 124" and individually as "computing resource 124").

Computing resource 124 includes one or more personal computers, workstation computers, server devices, or other types of computation and/or communication devices. In some implementations, computing resource 124 may host platform 120. The cloud resources may include compute instances executing in computing resource 124, storage devices provided in computing resource 124, data transfer devices provided by computing resource 124, etc. In some implementations, computing resource 124 may communicate with other computing resources 124 via wired connections, wireless connections, or a combination of wired and wireless connections.

As further shown in FIG. 1, computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

Application 124-1 includes one or more software applications that may be provided to or accessed by user device 110 and/or platform 120. Application 124-1 may eliminate a need to install and execute the software applications on user device 110. For example, application 124-1 may include software associated with platform 120 and/or any other software capable of being provided via cloud computing environment 122. In some implementations, one application 124-1 may send/receive information to/from one or more other applications 124-1, via virtual machine 124-2.

Virtual machine 124-2 includes a software implementation of a machine (e.g., a computer) that executes programs like a physical machine. Virtual machine 124-2 may be either a system virtual machine or a process virtual machine, depending upon use and degree of correspondence to any real machine by virtual machine 124-2. A system virtual machine may provide a complete system platform that supports execution of a complete operating system ("OS"). A process virtual machine may execute a single program, and may support a single process. In some implementations, virtual machine 124-2 may execute on behalf of a user (e.g., user device 110), and may manage infrastructure of cloud computing environment 122, such as data management, synchronization, or long-duration data transfers.

Virtualized storage 124-3 includes one or more storage systems and/or one or more devices that use virtualization techniques within the storage systems or devices of computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 124-4 may provide hardware virtualization techniques that allow multiple operating systems (e.g., "guest operating systems") to execute concurrently on a host computer, such as computing resource 124. Hypervisor 124-4 may present a virtual operating platform to the guest operating systems, and may manage the execution of the guest operating systems. Multiple instances of a variety of operating systems may share virtualized hardware resources.

Network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
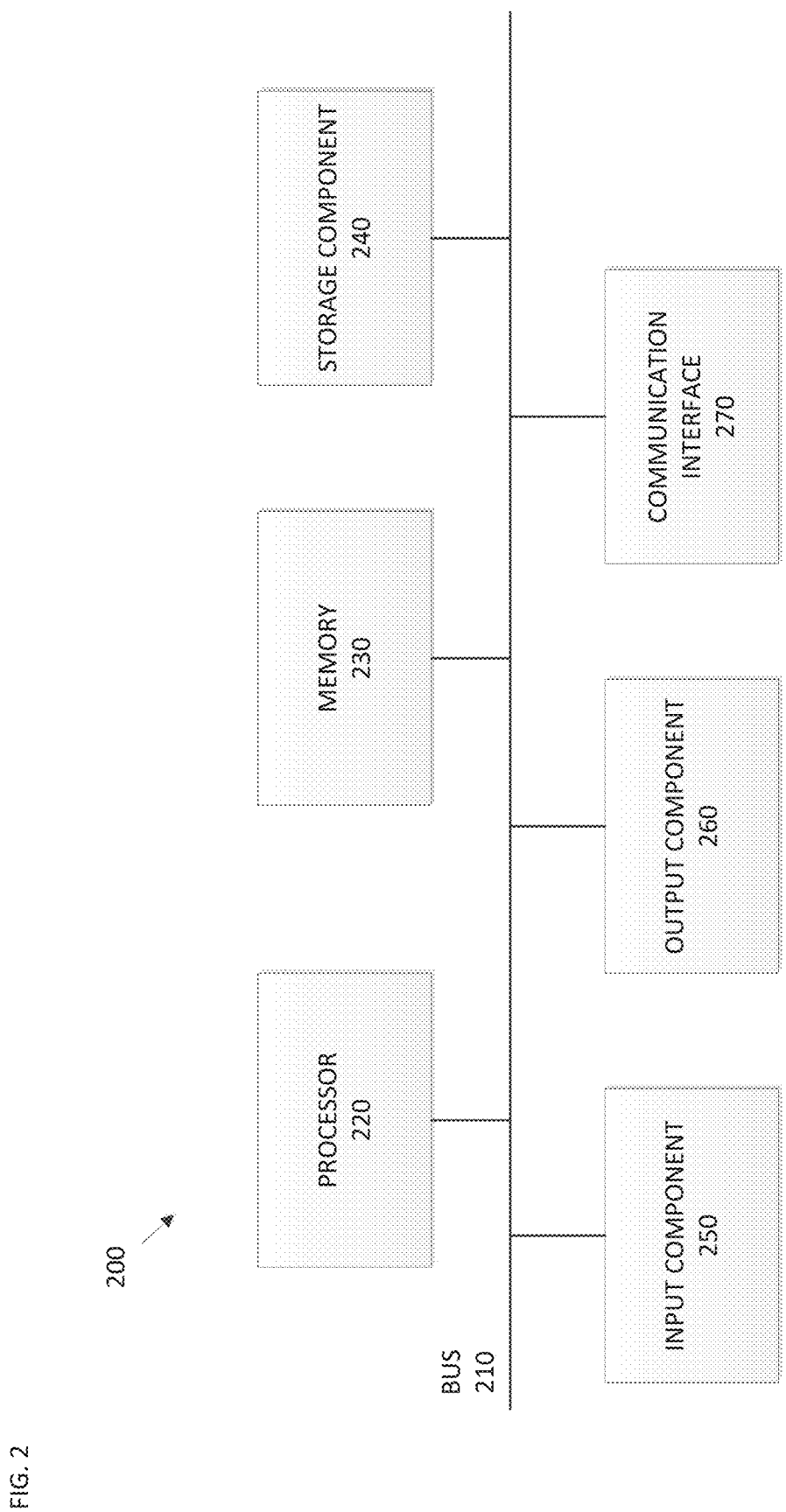
FIG. 2 is a diagram of example components of one or more devices of FIG. 1.

FIG. 2 is a diagram of example components of one or more devices of FIG. 1. A device 200 may correspond to user device 110 and/or platform 120. As shown in FIG. 2, device 200 may include a bus 210, a processor 220, a memory 230, a storage component 240, an input component 250, an output component 260, and a communication interface 270.

Bus 210 includes a component that permits communication among the components of device 200. Processor 220 is implemented in hardware, firmware, or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 250 includes a component that permits device 200 to receive information, such as via user input (e.g., a touch screen display, a keyboard, a keypad, a mouse, a button, a switch, and/or a microphone). Additionally, or alternatively, input component 250 may include a sensor for sensing information (e.g., a global positioning system (GPS) component, an accelerometer, a gyroscope, and/or an actuator). Output component 260 includes a component that provides output information from device 200 (e.g., a display, a speaker, and/or one or more light-emitting diodes (LEDs)).

Communication interface 270 includes a transceiver-like component (e.g., a transceiver and/or a separate receiver and transmitter) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

Device 200 may perform one or more processes described herein. Device 200 may perform these processes in response to processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Embodiments described herein include a training scheme that is targeted to sequence models in which an output at time t has a dominant impact on an output at time t+1. Instead of applying gradients to a whole sequence as traditional training schemes do, the new training scheme aims at a first wrong decoding position of the sequence. Moreover, rather than selecting one or more hypotheses with highest posteriors, the new training scheme selects a hypothesis with a longest correctly-decoded prefix. Like other sequence-based training schemes, this new training scheme is applied after a model is trained with a point-wise cross entropy loss.

This training scheme is not limited to speech recognition, but can also be applied in other sequence-to-sequence tasks.

Figure 3:
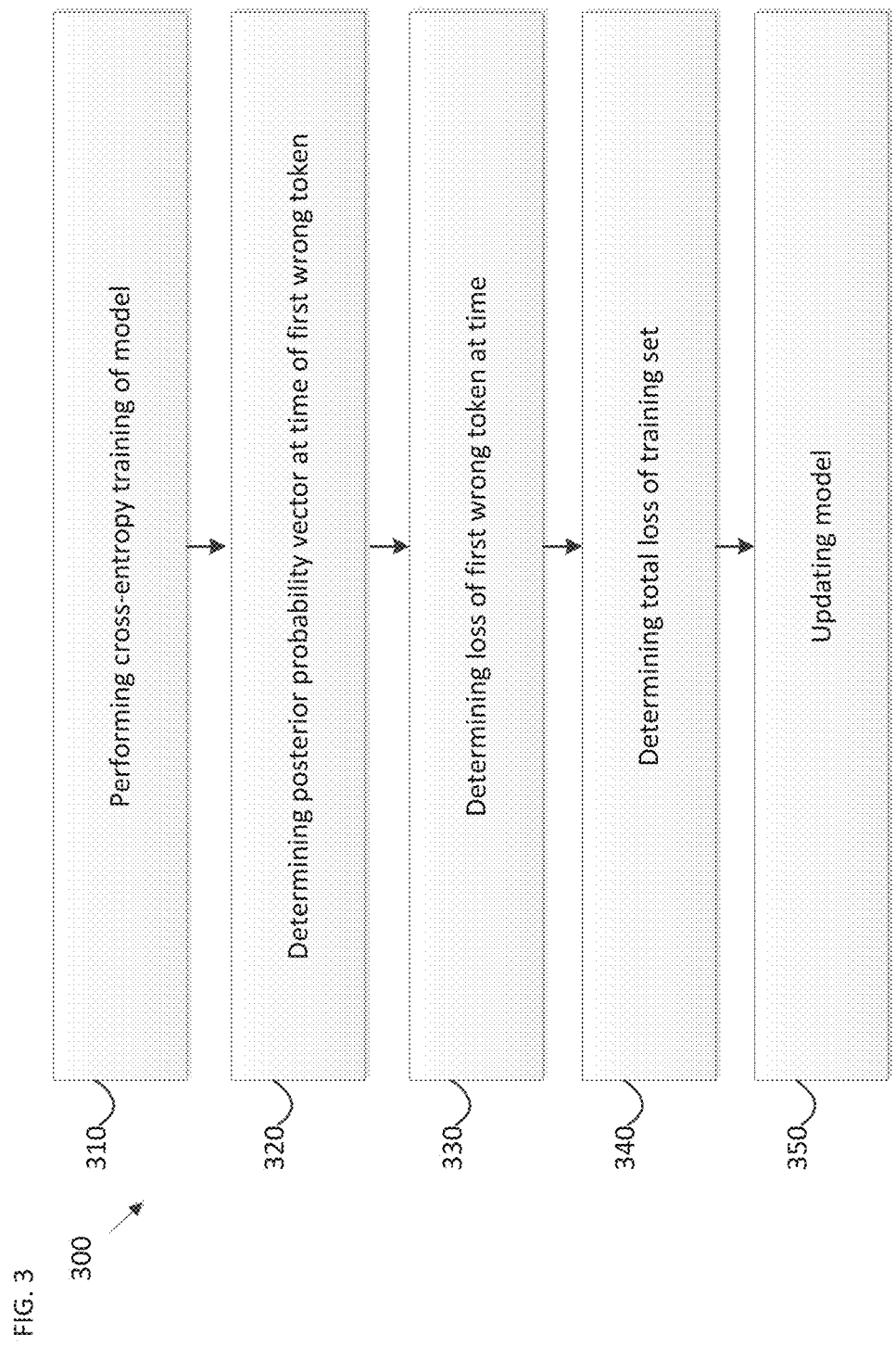
FIG. 3 is a flowchart of a method of A-E2E ASR training, according to embodiments.

FIG. 3 is a flowchart of an example method 300 of A-E2E ASR training, according to embodiments. In some implementations, one or more process blocks of FIG. 3 may be performed by platform 120. In some implementations, one or more process blocks of FIG. 3 may be performed by another device or a group of devices separate from or including platform 120, such as user device 110.

As shown in FIG. 3, in operation 310, the method 300 includes performing cross-entropy training of a model, based on one or more input features of a speech signal. Based on the cross-entropy training being performed, the method 300 includes performing token-wise training of the model of which the cross-entropy training is performed, in operations 320-360.

In operation 320, the method 300 includes determining a posterior probability vector at a time of a first wrong token among one or more output tokens of the model of which the cross-entropy training is performed.

An inference process of an A-E2E ASR system during evaluation can be expressed as Equations (1)-(3) below:

$$H^{enc} = \text{Encoder}(X) \tag{1}$$

$$p_t = \text{Decoder}(y_{t-1}, H^{enc}) \tag{2}$$

$$y_t = {}_i \text{argmax}\{p_{t,i}\} \tag{3},$$

where matrix X denotes input audio features, $H^{enc}$ denotes encoded features, $y_t$ denotes an output token at a time t, $p_t$ denotes a posterior probability vector at the time t, and $p_{t,i}$ denotes a probability on a token dimension i at the time t. Note that decoder states and attention mechanisms are omitted in these equations for clarity purposes only.

During a training process without scheduled sampling, an output token $y_{t-1}$ at a time t−1 in Equation (2) is substitute by a reference token $r_{t-1}$ at time t−1 the in a golden transcription, as shown in Equation (4) below:

$$p_t = \text{Decoder}(r_{t-1}, H^{enc}) \tag{4}.$$

To tune a model towards an evaluation scenario, scheduled sampling is employed by using a mixture of the output token $y_{t-1}$ and the reference token $r_{t-1}$, as shown in Equation (5) below:

$$p_t = \text{Decoder}(s_{t-1} \in \{r_{t-1}, y_{t-1}\}, H^{enc}) \tag{5},$$

where $s_{t-1}$ is a token randomly selected from $\{r_{t-1}, y_{t-1}\}$. Due to a potential dependency of $y_t$ on $y_{t-1}$, an error at the time t−1 could easily cause mistakes in following output tokens $y_t, y_{t+1}, \ldots$. Assume that a first wrong token $y_{t^\omega}$ at a time $t^\omega$. In an extreme case, remaining output tokens y may have no overlap with remaining reference tokens r. In that case, when a first error is corrected, following errors could be avoided with less optimization efforts.

In operation 330, the method 300 includes determining a loss of the first wrong token at the time, based on the determined posterior probability vector.

In operation 340, the method 300 includes determining a total loss of a training set of the model of which the cross-entropy training is performed, based on the determined loss of the first wrong token.

In detail, in Equation (6) below, $l_\theta(y_t, r_t)$ denotes the loss of an output token y at the time t and L(θ) denotes a total loss of a training set. Model parameters are denoted as θ. A loss function can be expressed as Equation (6) below:

$$L(\theta) = \sum\nolimits_{(y,r) \in (Y,R)} \frac{1}{T} \sum\nolimits_{t=1}^{T} l_\theta(y_t, r_t), \tag{6}$$

where (Y,R) denotes hypothesis-reference pairs in the whole training set, and T is typically chosen to be min(M,N). This loss function treats all positions in an output sequence equally, making it difficult to model an output token dependency in A-E2E ASR models. Moreover, training repetitively on correctly recognized tokens may lead to oscillation. To ensure zero gradients on correctly decoded tokens, a TWT is used, as shown in Equation (9) below:

$$L(\theta)_{TWT} = \theta_{(y,r) \in (Y,R)} l_\theta(y_{t^\omega}, r_{t^\omega}) \tag{9}$$

According to Equation (9), TWT can be combined with various $l_\theta(y_t, r_t)$ values. In this description, two $l_\theta(y_t, r_t)$ values are applied, Ref and Ref+Err. Ref is a cross entropy (CE) loss at the time $t^\omega$ of the first wrong token $y_{t^\omega}$, as shown in Equation (10) below:

$$l_\theta(y_{t^\omega}, r_{t^\omega}) = -\log p_{t^\omega, r_{t^\omega}}, \tag{10}$$

where $$p_{t^\omega, r_{t^\omega}}$$

is generated as shown in Equation (5). Ref+Err differs from Ref in that it reduces a probability of a wrong dimension of the first wrong token $y_{t^\omega}$ at the same time, as shown in Equation (11) below:

$$l_\theta(y_{t^\omega}, r_{t^\omega}) = -\log p_{t^\omega, r_{t^\omega}} + \log p_{t^\omega, y_{t^\omega}}. \tag{11}$$

In most cases, a hypothesis (including the first wrong token $y_{t^\omega}$) is selected as one with a highest posterior probability (i.e., a one-best hypothesis). While applying TWT on multiple hypotheses, embodiments described herein include a TWTiB approach by selecting a hypothesis with a longest correct prefix. Let $y^i$ be an output token of a hypothesis j in a beam, and its $t^\omega$ be $t^{j,\omega}$. An output token of a hypothesis with a largest $t^{jl,\omega}$ is $y^{jl}$. TWTiB loss can be expressed as shown in Equation (12) below:

$$L(\theta)_{TWTiB} = \sum\nolimits_{(y,r) \in (Y,R)} l_\theta(y^{jl}_{t^{jl,\omega}}, r_{t^{jl,\omega}}). \tag{12}$$

FIG. 4 is a diagram of a first wrong token in a hypothesis with a longest correct prefix, according to embodiments. As shown in FIG. 4, the first wrong token is "wreck" in the hypothesis "It is not easy to wreck a nice beach."

Referring again to FIG. 3, in operation 350, the method 300 includes updating the model of which the cross-entropy training is performed, based on the determined total loss of the training set.

The embodiments include two points. A first point is a gradient update strategy in which only a first error occurred position is chosen to pass a gradient. This could be applied to another sequence translation or generation tasks in which a dependency among outputs is strong. A second point is a choice of a hypothesis for a loss function. Usually a hypothesis with a highest posterior is selected, but a new training scheme may benefit more from a hypothesis with a longest correct prefix being selected. Finally, even though only two types of likelihood-based loss functions are described in the embodiments, other loss functions could also be combined with the training scheme described herein.

Although FIG. 3 shows example blocks of the method 300, in some implementations, the method 300 may include additional blocks, fewer blocks, different blocks, or differently arranged blocks than those depicted in FIG. 3. Additionally, or alternatively, two or more of the blocks of the method 300 may be performed in parallel.

The embodiments provide better performance than that of a state-of-the-art MWER method on the same benchmark data set. They provide a new training principle for sequence generation related tasks by focusing on a first occurred error. A-E2E ASR systems, when trained with a scheduling sample, have output at the time t greatly affected by a previous output, and therefore benefit from this early update principle.

Models according to embodiments are compared with a benchmark SWB300h data set. The setup is the same as in MWER with 40-dim log mel (bank features as input and 49 characters as output. The E2E framework is input-feeding label attachment score (LAS) with 6 bidirectional-Long Short Term Memory (BiLSTM) as an encoder and 2 LSTM as a decoder. A baseline cross-entropy model is the same as that of MWER, which is trained with a scheduled sampling empowered cross entropy criterion. An Adam optimizer is used for training and an initial learning rate is $7.5*10^{-7}$. A dropout rate is selected to be 0.2 and a size of a mini batch is 8. For large margin training, in addition to large margin training on a one-best hypothesis, results using multiple hypotheses are reported. A number of hypotheses in MWER and a multi-hypothesis large margin criterion are the same. Results without using an external language model are denoted as "w/o LM" and those with language model are denoted as "w/LM."

Results and comparisons of TWT are shown in Table 1 below. Note that TWT only uses a single hypothesis, whereas MWER and TWTiB use multiple hypotheses and a numbers of hypotheses are both 4.

TABLE 1

Results and comparisons of TWT

| LM | CE | MWER [5] | TWT | TWTiB |
|---|---|---|---|---|
| w/o | 13.3 | 12.2 | 12.4 | 12.0 |
| w/ | — | 12.0 | — | 11.7 |

Comparisons of a representative TWT criterion, TWTiB, with previously proposed systems are shown in Table 3 below.

TABLE 3

Comparisons with other A-E2E speech recognition systems

| Systems | SWBD | CH |
|---|---|---|
| Seq2Seq + Trigram [2] | 25.8 | 46.0 |
| BPE + LSTMLM [4] | 11.8 | 25.7 |
| MWER w/o LM [5] | 12.2 | 23.3 |
| MWER + LSTMLM [11] | 12.0 | 23.1 |
| TWTiB w/o LM (proposed) | 12.0 | 24.0 |
| TWTiB + LSTMLM (proposed) | 11.7 | 23.5 |

Figure 5:
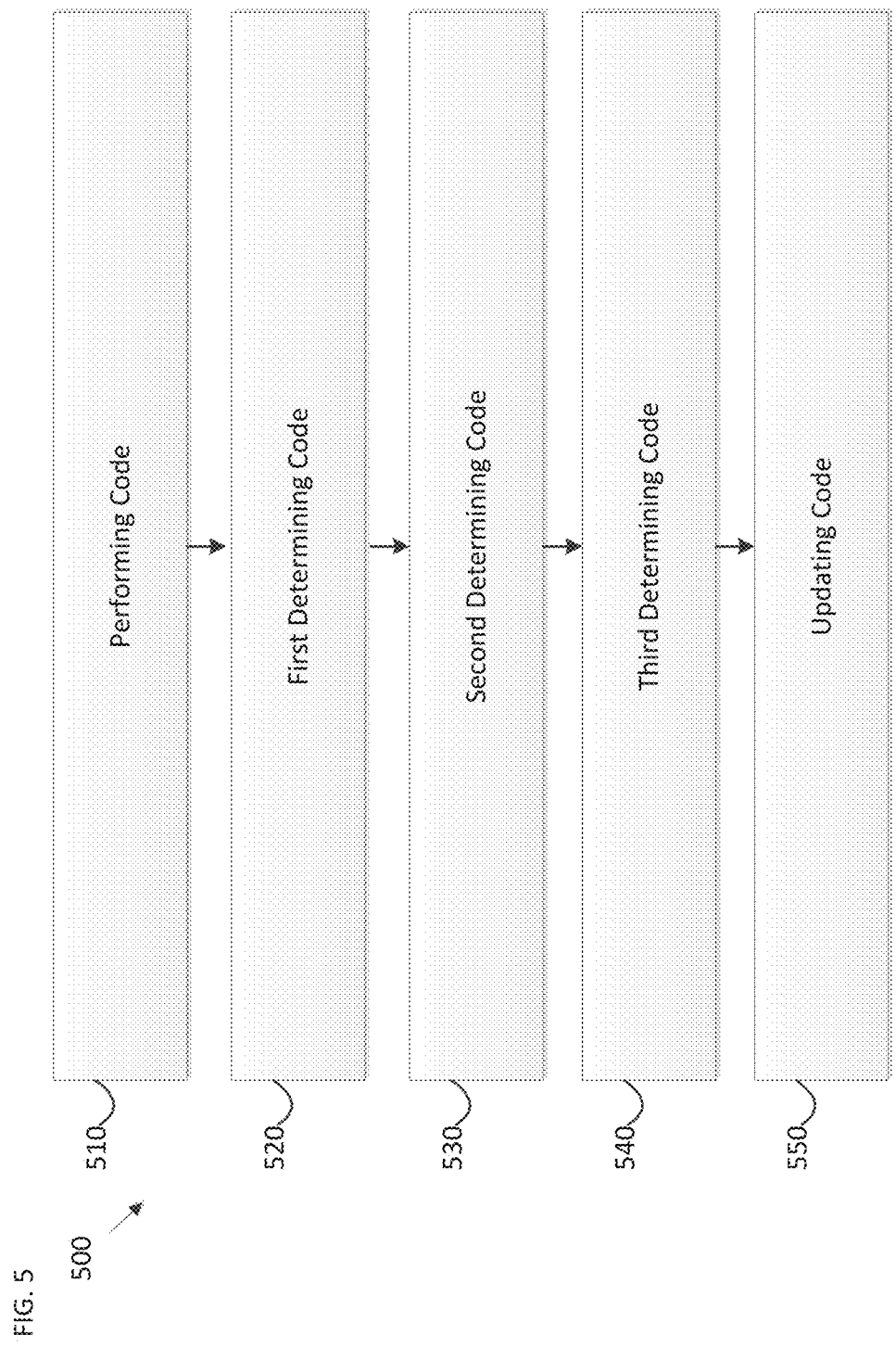
FIG. 5 is a diagram of an apparatus for A-E2E ASR training, according to embodiments.
Figure 6:
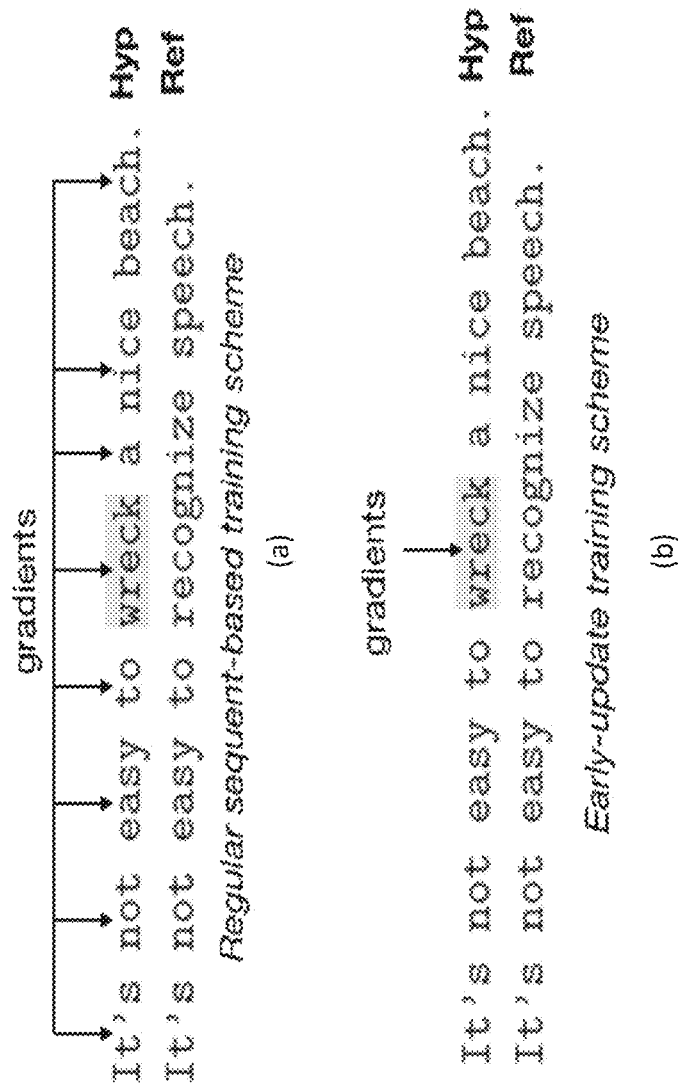
FIG. 6 is a diagram of a difference between a regular sequence-based training scheme and an early update training scheme.

FIG. 5 is a diagram of an apparatus 500 for A-E2E ASR training, according to embodiments. As shown in FIG. 5, the apparatus 500 includes performing code 510, first determining code 520, second determining code 530, third determining code 540 and updating code 550.

The performing code 510 is configured to perform cross-entropy training of a model, based on one or more input features of a speech signal.

The first determining code 520 is configured to determine a posterior probability vector at a time of a first wrong token among one or more output tokens of the model of which the cross-entropy training is performed.

The second determining code 530 is configured to determine a loss of the first wrong token at the time, based on the determined posterior probability vector.

The third determining code 540 is configured to determine a total loss of a training set of the model of which the cross-entropy training is performed, based on the determined loss of the first wrong token.

The updating code 550 is configured to update the model of which the cross-entropy training is performed, based on the determined total loss of the training set.

The apparatus 500 may further include selecting code configured to select a hypothesis with a longest correct prefix, from a plurality of hypotheses of the model of which the cross-entropy training is performed. The first determining code 520 may be further configured to determine the posterior probability vector at the time of the first wrong token included in the selected hypothesis.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of attention-based end-to-end (A-E2E) automatic speech recognition (ASR) training, the method comprising:
performing cross-entropy training of a model, based on one or more input features of a speech signal;
determining a posterior probability vector at a time of a first wrong token among one or more output tokens of the model of which the cross-entropy training is performed;
determining a loss of the first wrong token at the time, based on the determined posterior probability vector;
determining a total loss of a training set of the model of which the cross-entropy training is performed, based on $$L(\theta)_{TWT} = \sum_{(y,r) \in (Y,R)} l_\theta(y_{t^\omega}, r_{t^\omega}),$$

where $L(\theta)$ denotes the total loss of the training set, (Y,R) denotes hypothesis-reference pairs in the training set, $t^\omega$ denotes the time, $y_{t^\omega}$ denotes the first wrong token at the time, $r_{t^\omega}$ denotes a reference token at the time, and $l_\theta(y_{t^\omega}, r_{t^\omega})$ denotes the loss of the first wrong token; and
updating the model of which the cross-entropy training is performed, based on the determined total loss of the training set.

2. The method of claim 1, wherein the posterior probability vector at the time is determined as follows:

$$p_t = \text{Decoder}(s_{t-1} \in \{r_{t-1}, y_{t-1}\}, H^{enc}),$$

where t denotes the time, $p_t$ denotes the posterior probability vector at the time t, $H^{enc}$ denotes the one or more features that are encoded, $y_{t-1}$ denotes an output token at a previous time t−1, $r_{t-1}$ denotes a reference token at the previous time t−1, and $s_{t-1}$ denotes a token randomly selected from $\{r_{t-1}, y_{t-1}\}$.

3. The method of claim 1, wherein the loss of the first wrong token is determined as follows:

$$l_\theta(y_{t^\omega}, r_{t^\omega}) = -\log p_{t^\omega, r_t^\omega},$$

where $p_{t^\omega, r_t^\omega}$ denotes a posterior probability of the reference token at the time.

4. The method of claim 1, wherein the loss of the first wrong token is determined as follows:

$$l_\theta(y_{t^\omega}, r_{t^\omega}) = -\log p_{t^\omega, r_t^\omega} + \log p_{t^\omega, y_t^\omega},$$

where $p_{t^\omega, r_t^\omega}$ denotes a posterior probability of the reference token at the time, and $p_{t^\omega, y_t^\omega}$ denotes a posterior probability of the first wrong token at the time.

5. The method of claim 1, further comprising selecting a hypothesis with a longest correct prefix, from a plurality of hypotheses of the model of which the cross-entropy training is performed,
wherein the determining posterior probability vector at the time comprises determining the posterior probability vector at the time of the first wrong token included in the selected hypothesis.

6. The method of claim 5, wherein the total loss of the training set is determined as follows:

$$L(\theta)_{TWTiB} = \sum_{(y,r) \in (Y,R)} l_\theta(y^{jl}_{t^{jl,\omega}}, r_{t^{jl,\omega}}),$$

where $L(\theta)$ denotes the total loss of the training set, (Y,R) denotes hypothesis-reference pairs in the training set, $t^{jl,\omega}$ denotes the time, $y^{jl}_{t^{jl,\omega}}$ denotes the first wrong token at the time, $r_{t^{jl,\omega}}$ denotes a reference token at the time, and $$l_\theta(y^{jl}_{t^{jl,\omega}}, r_{t^{jl,\omega}})$$

denotes the loss of the first wrong token.

7. An apparatus for attention-based end-to-end (A-E2E) automatic speech recognition (ASR) training, the apparatus comprising:
at least one memory configured to store program code; and
at least one processor configured to read the program code and operate as instructed by the program code, the program code including:
performing code configured to cause the at least one processor to perform cross-entropy training of a model, based on one or more input features of a speech signal;
first determining code configured to cause the at least one processor to determine a posterior probability vector at a time of a first wrong token among one or more output tokens of the model of which the cross-entropy training is performed;
second determining code configured to cause the at least one processor to determine a loss of the first wrong token at the time, based on the determined posterior probability vector;
third determining code configured to cause the at least one processor to determine a total loss of a training set of the model of which the cross-entropy training is performed, based on $$L(\theta)_{TWT} = \sum_{(y,r) \in (Y,R)} l_\theta(y_{t^\omega}, r_{t^\omega}),$$

where $L(\theta)$ denotes the total loss of the training set, (Y,R) denotes hypothesis-reference pairs in the training set, $t^\omega$ denotes the time, $y_{t^\omega}$ denotes the first wrong token at the time, $r_{t^\omega}$ denotes a reference token at the time, and $l_\theta(y_{t^\omega}, r_{t^\omega})$ denotes the loss of the first wrong token; and updating code configured to cause the at least one processor to update the model of which the cross-entropy training is performed, based on the determined total loss of the training set.

8. The apparatus of claim 7, wherein the posterior probability vector at the time is determined as follows:

$$p_t = \text{Decoder}(s_{t-1} \in \{r_{t-1}, y_{t-1}\}, H^{enc}),$$

where t denotes the time, $p_t$ denotes the posterior probability vector at the time t, $H^{enc}$ denotes the one or more features that are encoded, $y_{t-1}$ denotes an output token at a previous time t−1, $r_{t-1}$ denotes a reference token at the previous time t−1, and $s_{t-1}$ denotes a token randomly selected from $\{r_{t-1}, y_{t-1}\}$.

9. The apparatus of claim 7, wherein the loss of the first wrong token is determined as follows:

$$L_\theta(y_t^\omega, r_t^\omega) = -\log p_{t^\omega, r_t^\omega},$$

where $p_{t^\omega, r_t^\omega}$ denotes a posterior probability of the reference token at the time.

10. The apparatus of claim 7, wherein the loss of the first wrong token is determined as follows:

$$l_\theta(y_t^\omega, r_t^\omega) = -\log p_{t^\omega, r_t^\omega} + \log p_{t^\omega, y_t^\omega},$$

where $p_{t^\omega, r_t^\omega}$ denotes a posterior probability of the reference token at the time, and $p_{t^\omega, y_t^\omega}$ denotes a posterior probability of the first wrong token at the time.

11. The apparatus of claim 7, further comprising selecting code configured to cause the at least one processor to select a hypothesis with a longest correct prefix, from a plurality of hypotheses of the model of which the cross-entropy training is performed,
wherein the first determining code is further configured to cause the at least one processor to determine the posterior probability vector at the time of the first wrong token included in the selected hypothesis.

12. The apparatus of claim 11, wherein the total loss of the training set is determined as follows:

$$L(\theta)_{TWTiB} = \sum_{(y,r) \in (Y,R)} l_\theta\left(y_{t^{jl,\omega}}^{jl}, r_{t^{jl,\omega}}\right),$$

where $L(\theta)$ denotes the total loss of the training set, (Y,R) denotes hypothesis-reference pairs in the training set, $t^{jl,\omega}$ denotes the time, $$y_{t^{jl,\omega}}^{jl}$$

denotes the first wrong token at the time, $r_{t^{jl,\omega}}$ denotes a reference token at the time, and $$l_\theta\left(y_{t^{jl,\omega}}^{jl}, r_{t^{jl,\omega}}\right)$$

denotes the loss of the first wrong token.

13. A non-transitory computer-readable medium storing instructions that, when executed by at least one processor of a device, cause the at least one processor to:

perform cross-entropy training of a model, based on one or more input features of a speech signal;
determine a posterior probability vector at a time of a first wrong token among one or more output tokens of the model of which the cross-entropy training is performed;
determine a loss of the first wrong token at the time, based on the determined posterior probability vector;
determine a total loss of a training set of the model of which the cross-entropy training is performed, based on $$L(\theta)_{TWT} = \sum_{(y,r) \in (Y,R)} l_\theta(y_{t^\omega}, r_{t^\omega}),$$

where $L(\theta)$ denotes the total loss of the training set, (Y,R) denotes hypothesis-reference pairs in the training set, $t^\omega$ denotes the time, $y_{t^\omega}$ denotes the first wrong token at the time, $r_{t^\omega}$ denotes a reference token at the time, and $L_\theta(y_{t^\omega}, r_{t^\omega})$ denotes the loss of the first wrong token and
update the model of which the cross-entropy training is performed, based on the determined total loss of the training set.

14. The non-transitory computer-readable medium of claim 13, wherein the posterior probability vector at the time is determined as follows:

$$p_t = \text{Decoder}(s_{t-1} \in \{r_{t-1}, y_{t-1}\}, H^{enc}),$$

where t denotes the time, $p_t$ denotes the posterior probability vector at the time t, $H^{enc}$ denotes the one or more features that are encoded, $y_{t-1}$ denotes an output token at a previous time t−1, $r_{t-1}$ denotes a reference token at the previous time t−1, and $s_{t-1}$ denotes a token randomly selected from $\{r_{t-1}, y_{t-1}\}$.

15. The non-transitory computer-readable medium of claim 13, wherein the loss of the first wrong token is determined as follows:

$$l_\theta(y_t^\omega, r_t^\omega) = -\log p_{t^\omega, r_t^\omega},$$

where $p_{t^\omega, r_t^\omega}$ denotes a posterior probability of the reference token at the time.

16. The non-transitory computer-readable medium of claim 13, wherein the loss of the first wrong token is determined as follows:

$$l_\theta(y_t^\omega, r_t^\omega) = -\log p_{t^\omega, r_t^\omega} + p_{t^\omega, y_t^\omega},$$

where $p_{t^\omega, r_t^\omega}$ denotes a posterior probability of the reference token at the time, and $p_{t^\omega, y_t^\omega}$ denotes a posterior probability of the first wrong token at the time.

17. The non-transitory computer-readable medium of claim 13, wherein the instructions further cause the at least one processor to:
select a hypothesis with a longest correct prefix, from a plurality of hypotheses of the model of which the cross-entropy training is performed; and
determine the posterior probability vector at the time of the first wrong token included in the selected hypothesis.

* * * * *